Dec. 12, 1972   F. H. THEYSE   3,706,059
ANNULAR MAGNET
Filed April 12, 1971

INVENTOR
FREDERIK HERMAN THEYSE

BY
ATTORNEYS

United States Patent Office 3,706,059
Patented Dec. 12, 1972

3,706,059
ANNULAR MAGNET
Frederik H. Theyse, Voorschoten, Netherlands, assignor to Reactor Centrum Nederland, The Hague, Netherlands
Filed Apr. 12, 1971, Ser. No. 133,122
Claims priority, application Netherlands, Apr. 20, 1970, 7005648
Int. Cl. H01f 7/02
U.S. Cl. 335—302                                  5 Claims

ABSTRACT OF THE DISCLOSURE

Annular magnet composed of a plurality of cylindrical permanent magnets, with similar poles pointing in the same direction, at least one of these magnets being rotatable around its cylinder axis.

---

The invention relates to an annular magnet composed of a number of cylindrical permanent magnets surrounding each other coaxially in such a manner that similar poles point in the same direction.

Annular magnets of this kind, especially if made of pressed magnetic material, have hitherto shown the drawback that the magnetism was not distributed in a perfectly uniform manner over the circumference of the magnetic ring. In order to meet this difficulty at least one of these permanent magnets is mounted, according to the invention, between the other magnets in such a way that it is rotatable in its annular plane.

In this set-up the said permanent magnets may expediently be mounted in such a way that they fit cylindrically into each other as a nest, with but little clearance.

Owing to the fact that the various part-rings lie close to each other because of the very light clearance, the magnetic fluxes of the various rings can influence each other more effectively.

With pressed magnets it often happens that angular deviations in direction of the magnetic field as it emerges from the ring occur along the circumference of the magnetic rings. This is due to the fact that for reasons of economy magnetic rings of this kind are pressed simultaneously in large numbers while being subjected to one and the same magnetic field. Of course this magnetic field, which is operative in the press, cannot have precisely the same direction throughout. These deviations in direction of the magnetic field in the press are therefore also to be found in the pressed magnetic rings.

With the construction according to the invention it is now possible to turn the part-rings into a certain position with respect to each other in such a way that such unwanted angular deviations of the magnetic field can be offset.

In order to facilitate this turning of the magnetic rings with respect to each other one may introduce lubricants into the cylindrical contact surfaces or at least one bearing.

If a bearing is introduced, for instance a ball bearing, it may be brought into position during the pressing of the magnetic rings.

After this the magnetic rings have to be adjusted, for which purpose it is ascertained by measurement whether the magnetic field still shows deviations which cannot be tolerated. By turning a movable magnetic ring through different angles a position is ultimately found at which this deviation is reduced to a minimum.

It is possible, should this be desired, to bring the magnetics automatically into the optimum position with respect to each other by mounting them coaxially in such a way that rotation around their common axis entails little or no friction, after which the permanent magnets are subjected to the influence of a repellent magnetic field whose direction is in accordance with the above-mentioned axis.

For the means to permit rotation with little or no friction, use may be made of a number of constructions known per se. Thus, during this process of optimum setting, the individual permanent magnets may for instance be floatingly supported in a liquid such as mercury.

Should a bearing, for instance a ball bearing, be used which has very slight rolling friction, it is generally also possible to effect the adjustment of the optimum position by simply placing the magnet between the pole-pieces of a repellent electromagnet of sufficient strength. After switching this electromagnet into circuit and possibly fixing one of the annular magnets in a stationary position, each movable annular magnet will set itself at the position of most uniformly distributed magnetism.

In the latter case the fixing of the magnetic rings in this position with respect to each other is preferably effected by introducing a thermosetting plastic into the free space of the bearing slot.

The invention will be further elucidated by reference to the following drawings, in which:

FIG. 1 gives a top plan view of a magnetic ring according to the invention;

Figure 1:
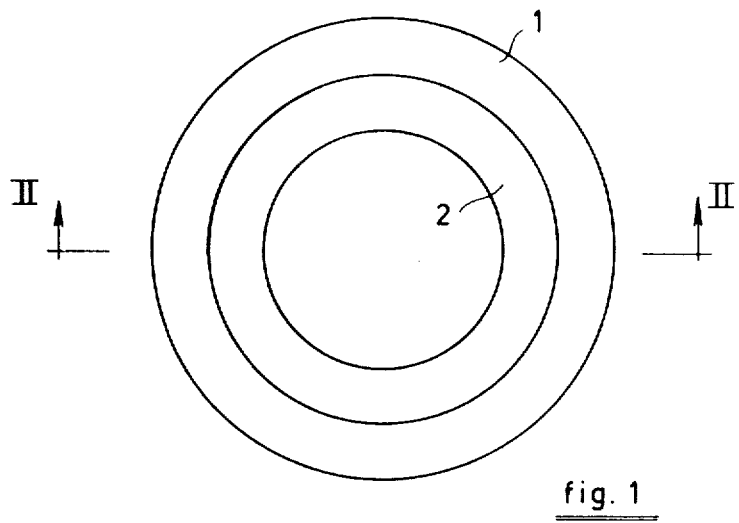
Figure 2:
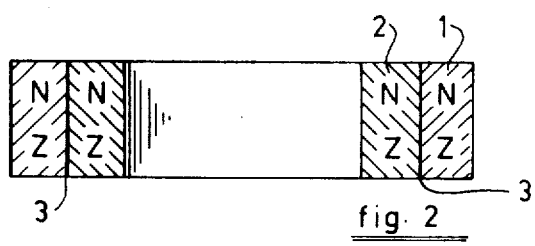
FIG. 2 is a vertical cross-section of the ring shown in FIG. 1.
Figure 3:
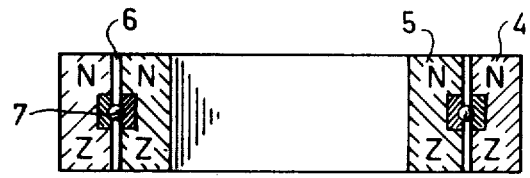
FIG. 3 is a vertical cross-section of a variant of FIG. 2, this time provided with a ball bearing.

FIG. 1 represents two magnetic rings 1 and 2 fitting into each other with but little clearance. FIG. 2 shows, in a vertical cross-section of the same rings, that similar magnetic poles point in the same direction. At 3 a clearance space is provided into which a lubricant is introduced, for instance in the form of a lubricating paste. FIG. 3 shows a set of magnetic rings 4 and 5 fitting into each other in a similar way as in FIG. 2. In this case, however, the clearance space 6 is much broader than in FIG. 2, whilst at the same time a ball bearing 7 is incorporated in the magnetic rings.

Wherever cylindrical magnets are mentioned in this specification or in the subsequent claims, this also relates to magnets at least one of whose end faces is not a flat surface.

An end face of this kind may be cured or denticulated or otherwise deviate from a flat form.

I claim:

1. Annular composite magnetic structure of permanently magnetic material, comprising a plurality of cylindrical axially polarized magnets, nesting coaxially together in such a manner, that similarly named axial magnetic poles are pointing in the same axial direction, at least one of said permanent magnets being mounted cylindrically within an outer magnet so as to provide a clearance space therebetween so that relative rotation of the cylindrical magnets is possible around the axis of the composite magnetic structure to orient the magnetic field along the axis of the composite magnetic structure.

2. An annular magnet according to claim 1, characterized in that means are provided in the cylindrical contact surfaces to permit turning of the permanent magnets with respect to each other.

3. An annular magnet according to claim 2, characterized in that these means consist of a bearing.

4. An annular magnet according to claim 3, characterized in that the magnetic material is pressed around the bearing parts that are movable with respect to each other.

5. An annular magnet according to claim 2, characterized in that a lubricating paste is introduced into each clearance space.

References Cited

UNITED STATES PATENTS 2,974,981    3/1961    Vervest et al. _____ 335—306 X
3,223,898    12/1965   Bey _____ 335—306 X GEORGE HARRIS, Primary Examiner U.S. Cl. X.R.

335—306